(12) United States Patent
Holmer

(10) Patent No.: US 8,797,378 B1
(45) Date of Patent: Aug. 5, 2014

(54) DISTRIBUTED COMMUNICATIONS

(75) Inventor: Stefan Holmer, Hagersten (SE)

(73) Assignee: Google Inc., Mountain View, CA (US)

( * ) Notice: Subject to any disclaimer, the term of this patent is extended or adjusted under 35 U.S.C. 154(b) by 307 days.

(21) Appl. No.: 13/351,944

(22) Filed: Jan. 17, 2012

(51) Int. Cl.
*H04N 7/14* (2006.01)

(52) U.S. Cl.
USPC ..................................... 348/14.08; 348/14.11

(58) Field of Classification Search
CPC ... H04L 4/0893; H04L 1/0041; H04L 1/0045; H04L 1/0057; H04L 1/12; H04L 5/24; H04L 7/04; H04L 1/00; H03M 7/00; G06F 15/16; G06F 11/14; G06F 17/30; H04M 3/2281; H04M 3/42017; H04M 3/42153; H04M 3/42365; H04M 1/64; H04N 5/445; H04N 7/14
USPC .......... 348/14.11, 14.08; 379/88.16; 709/217, 709/219
See application file for complete search history.

(56) References Cited

U.S. PATENT DOCUMENTS

| 3,381,273 | A | * | 4/1968 | Held et al. ..................... 714/775 |
| 5,801,756 | A | * | 9/1998 | Iizawa ....................... 348/14.11 |
| 7,123,696 | B2 | * | 10/2006 | Lowe .......................... 379/88.16 |
| 7,707,247 | B2 | | 4/2010 | Dunn et al. |
| 7,769,756 | B2 | * | 8/2010 | Krikorian et al. ............. 707/736 |
| 7,920,158 | B1 | * | 4/2011 | Beck et al. .................. 348/14.08 |
| 7,973,857 | B2 | | 7/2011 | Ahmaniemi et al. |
| 2007/0127671 | A1 | | 6/2007 | Chua et al. |
| 2007/0200923 | A1 | | 8/2007 | Eleftheriadis et al. |
| 2009/0045987 | A1 | * | 2/2009 | Cho et al. ......................... 341/50 |
| 2010/0302446 | A1 | | 12/2010 | Mauchly et al. |
| 2013/0346564 | A1 | * | 12/2013 | Warrick et al. ............... 709/219 |

* cited by examiner

*Primary Examiner* — Mohammad Islam
(74) *Attorney, Agent, or Firm* — Young Basile Hanlon & MacFarlane P.C.

(57) ABSTRACT

In one method for communicating, a server can receive a first encoded media stream from a first sending device and a second encoded media stream from a second sending device from a plurality of co-located sending devices. The server can determine spatial relationships between the plurality of co-located sending devices and a plurality of co-located receiving devices. The server can select a first receiving device as a destination for the first encoded media stream and a second receiving device as a destination for the second encoded media stream based on the sending and receiving spatial relationships. The server can send the first encoded media stream to the first receiving device and the second encoded media stream to the second receiving device to be decoded and rendered. The spatial relationships can be based on physical locations for the plurality of co-located sending and receiving devices.

20 Claims, 3 Drawing Sheets

DISTRIBUTED COMMUNICATIONS

TECHNICAL FIELD

The present disclosure relates generally to communication methods and systems.

BACKGROUND

Conferencing allows multiple users to communicate with each other from different locations. Videoconferencing is a popular type of conferencing that incorporates both audio and video communications. Videoconferencing systems typically transmit both video streams and audio streams between different locations. Some videoconferencing systems, known as telepresence systems, process multiple video streams and audio streams from users in a source sending location before transmitting these streams to another videoconferencing system at a remote receiving location. The receiving videoconference system at the remote receiving location then further processes and displays the multiple video streams and audio streams.

SUMMARY

Systems and methods for communicating are disclosed. In one implementation, a method of communicating includes receiving at least a first encoded media stream sent from a first sending device of a plurality of co-located sending devices and a second encoded media stream sent from a second sending device of the plurality of co-located sending devices. The method further includes determining a spatial relationship between the plurality of co-located sending devices to define a sending spatial relationship and determining a spatial relationship between a plurality of co-located receiving devices to define a receiving spatial relationship.

The method further includes selecting a first receiving device from the plurality of co-located receiving devices as a destination for the first encoded media stream based on the sending spatial relationship and the receiving spatial relationship and selecting a second receiving device from the plurality of co-located receiving devices as a destination for the second encoded media stream based on the sending spatial relationship and the receiving spatial relationship. The method further includes sending the first encoded media stream to the first receiving device to be decoded and rendered on the first receiving device and sending the second encoded media stream to the second receiving device to be decoded and rendered on the second receiving device.

In another implementation, a method of communicating includes receiving at least a first encoded media stream sent from a first sending device of a plurality of co-located sending devices and a second encoded media stream sent from a second sending device of the plurality of co-located sending devices. The method further includes synchronizing the first encoded media stream and the second encoded media stream based on the co-located sending devices, determining a spatial relationship between the plurality of co-located sending devices to define a sending spatial relationship, and determining a spatial relationship between a plurality of co-located receiving devices to define a receiving spatial relationship.

The method further includes selecting a first receiving device from the plurality of co-located receiving devices as a destination for the first encoded media stream based on the sending spatial relationship and the receiving spatial relationship and selecting a second receiving device from the plurality of co-located receiving devices as a destination for the second encoded media stream based on the sending spatial relationship and the receiving spatial relationship. The method further includes synchronizing the first encoded media stream and the second encoded media stream based on the co-located receiving devices, sending the first encoded media stream to the first receiving device to be decoded and rendered on the first receiving device, and sending the second encoded media stream to the second receiving device to be decoded and rendered on the second receiving device.

In another implementation, a system is disclosed for communicating. The system includes a plurality of co-located sending devices, each co-located sending device including one or more processors and a memory. The system further includes a plurality of co-located receiving devices, each co-located receiving device including one or more processors and a memory. The system further includes a server configured to communicate with the plurality of co-located sending devices and the plurality of co-located receiving devices. The server includes one or more processors for controlling the operations of the server and a memory for storing data and program instructions used by the one or more processors.

The one or more processors of the server are configured to execute instructions stored in the memory to receive at least a first encoded media stream sent from a first sending device of the plurality of co-located sending devices and a second encoded media stream sent from a second sending device of the plurality of co-located sending devices. The one or more processors are further configured to determine a spatial relationship between the plurality of co-located sending devices to define a sending spatial relationship and determine a spatial relationship between a plurality of co-located receiving devices to define a receiving spatial relationship.

The one or more processors are further configured to select a first receiving device from the plurality of co-located receiving devices as a destination for the first encoded media stream based on the sending spatial relationship and the receiving spatial relationship and select a second receiving device from the plurality of co-located receiving devices as a destination for the second encoded media stream based on the sending spatial relationship and the receiving spatial relationship. The one or more processors are further configured to send the first encoded media stream to the first receiving device to be decoded and rendered on the first receiving device and send the second encoded media stream to the second receiving device to be decoded and rendered on the second receiving device.

BRIEF DESCRIPTION OF THE DRAWINGS

The description herein makes reference to the accompanying drawings wherein like reference numerals refer to like parts throughout the several views, and wherein.

DETAILED DESCRIPTION

In the distributed communication system and methods described herein, device users can join a videoconference using independent devices. Each independent device can capture media streams for representing the user of the device. The system and methods allow for identification of the location of the independent devices participating in the videoconference, for example sending devices and receiving devices. The system and methods can further identify co-located devices and represent the spatial relationship between the co-located devices during the videoconference.

Figure 1:
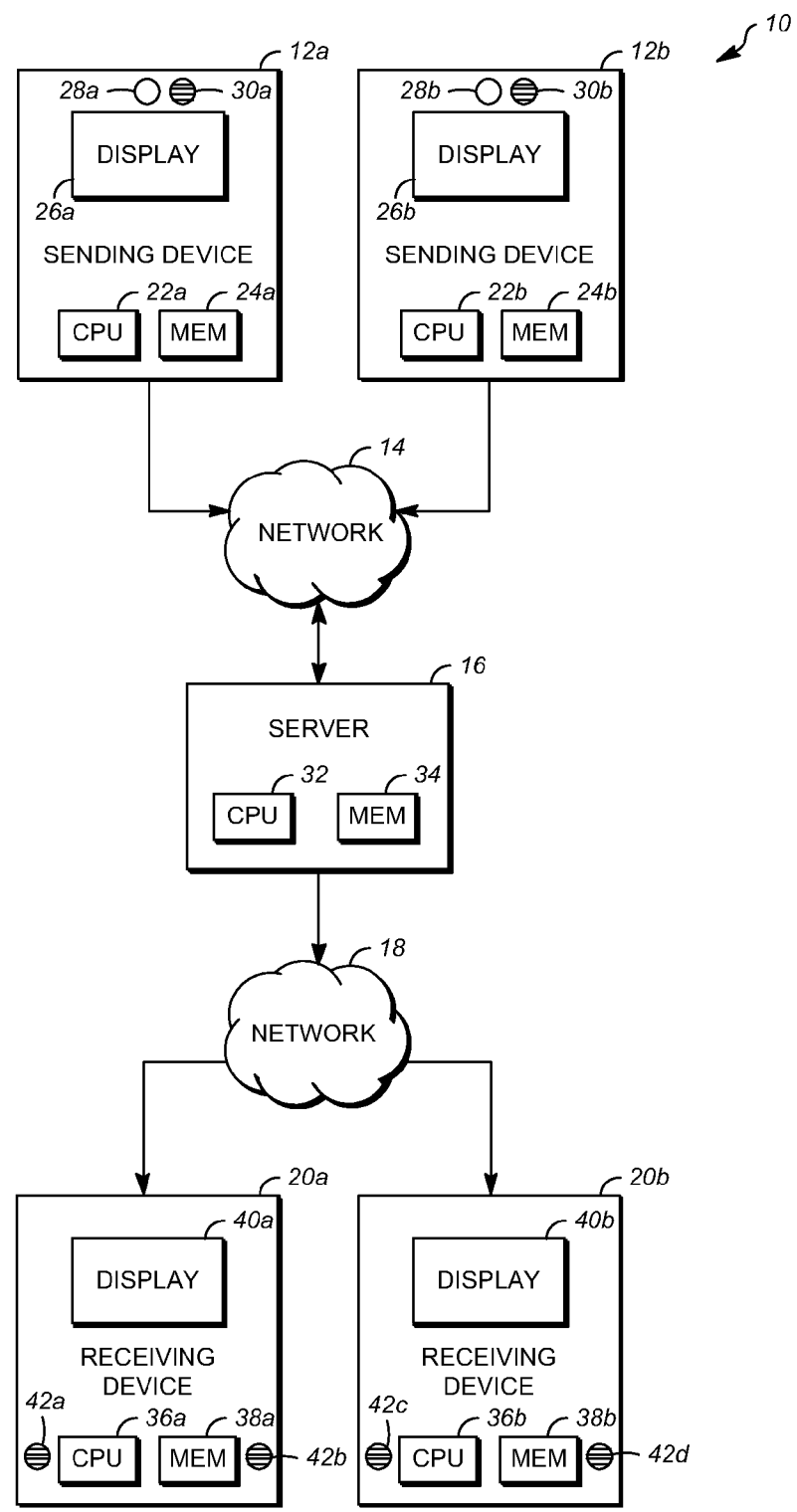
FIG. 1 is a block diagram of a communication system.

FIG. 1 is a block diagram of a system 10 in accordance with one implementation. The system 10 can include a plurality of co-located sending devices 12a-b, a sending network 14, a server 16, a receiving network 18, and a plurality of co-located receiving devices 20a-b.

The co-located sending devices 12a-b can include processors such as central processing units (CPUs) 22a-b and memories 24a-b. The memories 24a-b can store data and program instructions that are used by the CPUs 22a-b. The co-located sending devices 12a-b can also include or be in communication with one or more input-output devices, such as display screens 26a-b. For example, the co-located sending devices 12a-b can be laptop computers, tablets, notebook computers, or any device of any kind capable of capturing and sending information.

The co-located sending devices 12a-b can also include or be in communication with means for capturing media streams. The co-located sending devices 12a-b can include or be in communication with image-sensing devices, for example front-facing cameras 28a-b, or any other image-sensing devices now existing or hereafter developed that can sense the images of users operating the co-located sending devices 12a-b. The front-facing cameras 28a-b can be positioned such that they are directed toward users operating the co-located sending devices 12a-b. The position and optical axis of the front-facing cameras 28a-b can be configured such that the field of vision of the front-facing cameras 28a-b includes an area that is directly adjacent to display screens 26a-b, from which the display screens 26a-b are visible. The front-facing cameras 28a-b can be configured to receive images, for example, of the faces of users while the users operate the co-located sending devices 12a-b.

The co-located sending devices 12a-b can also include or be in communication with sound-sensing devices, for example microphones 30a-b, or any other sound-sensing device now existing or hereafter developed that can sense the sounds made by the users operating the co-located sending devices 12a-b. The microphones 30a-b can be positioned such that they are directed toward users operating the co-located sending devices 12a-b. The microphones 30a-b can be configured to receive sounds, for example, speech or other utterances made by the users while the users operate the co-located sending devices 12a-b.

The sending network 14 can put the co-located sending devices 12a-b in communication with the server 16 for transferring media streams between the co-located sending devices 12a-b and the server 16. The media streams transferred from the co-located sending devices 12a-b to the server 16 can include audio streams, video streams, or any other type of media streams.

The server 16 can include a processor such as central processing unit (CPU) 32 and a memory 34. The memory 34 can store data and program instructions that are used by the CPU 32. The server 16 can, for example, process the media streams received from the co-located sending devices 12a-b as described in one of the below methods before transferring the media streams to the plurality of co-located receiving devices 20a-b over the receiving network 18.

The receiving network 18 can put the server 16 in communication with the plurality of co-located receiving devices 20a-b for transferring the media streams between the server 16 and the plurality of co-located receiving devices 20a-b.

The co-located receiving devices 20a-b can include processors such as central processing units (CPUs) 36a-b and memories 38a-b. The memories 38a-b can store data and program instructions that are used by the CPUs 36a-b. The co-located receiving devices 20a-b can also include or be in communication with one or more input-output devices, such as display screens 40a-b. The display screens 40a-b can enable users of the co-located receiving devices 20a-b to view media streams, specifically video streams, transferred to the co-located receiving devices 20a-b from the co-located sending devices 12a-b.

The co-located receiving devices 20a-b can also include or be in communication with one or more sound-producing devices, for example speakers 42a-d, or any other sound-producing devices now existing or hereafter developed that can render, e.g. play, sounds derived from media streams on the co-located receiving devices 20a-b. The speakers 42a-d can be positioned such that they direct sound toward the users operating the co-located receiving devices 20a-b. The speakers 42a-d can be configured to play sounds, for example, speech or other utterances, that convey the spatial relationship of users operating the co-located sending devices 12a-b if the media streams played by the speakers 42a-d are audio streams transferred from the co-located sending devices 12a-b.

The CPUs in the above described co-located sending devices 12a-b, server 16, and co-located receiving devices 20a-b can be conventional central processing units. Alternatively, the CPUs can be any other type of device, or multiple devices, capable of manipulating or processing information now-existing or hereafter developed. Although the disclosed implementations can be practiced with a single processor, they can also be practiced using more than one processor. The memories can be random access memory (RAM). Any other suitable type of storage can also be used as the memories.

The display screens 26a-b, 40a-b in the above described co-located sending devices 12a-b and co-located receiving devices 20a-b can be implemented in various forms, including a liquid crystal display (LCD), a cathode-ray tube display (CRT), or a light emitting diode display (LED), such as an OLED display. Other input-output devices that permit users to program or otherwise use the co-located sending devices 12a-b and the co-located receiving devices 20a-b can be provided in addition to or as an alternative to the display screens 26a-b, 40a-b.

The networks 14, 18 in the above described system 10, can, for example, be or include the Internet. The networks 14, 18 can also be or include a local area network (LAN), wide area network (WAN), virtual private network (VPN), wireless local area network such as one based on the IEEE 802.11 standards, or any other means of transferring media streams between the components in the system 10. Communication using the networks 14, 18 can also be based on any other suitable wireless standards such as 3G or 4G.

Figure 2:
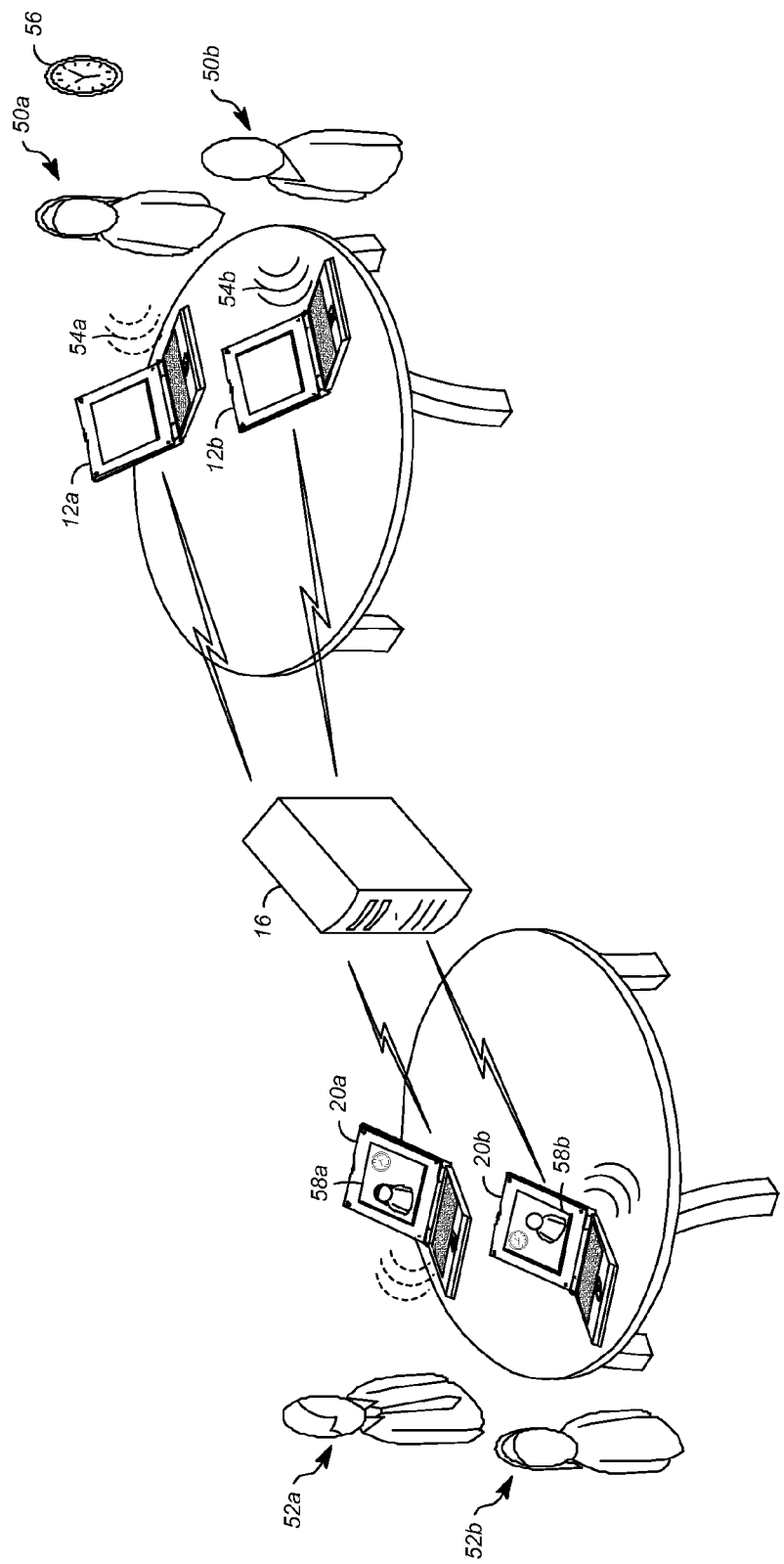
FIG. 2 is a schematic illustration of use of the communication system.

FIG. 2 is a schematic illustration of use of the communication system 10. Sending device users 50a-b can operate a pair of co-located sending devices 12a-b. For example, a pair of users seated near each other at a conference room table can each operate their own computing device, such as a laptop computer. The sending device users 50a-b can configure the co-located sending devices 12a-b to capture media streams for transfer to receiving device users 52a-b operating a pair of co-located receiving devices 20a-b. For example, a second pair of users is seated near each other at a conference room table at a remote location from the first pair of users and the second pair of users are each operating laptop computers in the remote location. The captured media streams can be transferred from the co-located sending devices 12a-b to the co-located receiving devices 20a-b to establish a conference between the sending device users 50a-b and the receiving device users 52a-b. If the conference is a video conference, for example, the media streams transferred from the co-located sending devices 12a-b to the co-located receiving devices 20a-b can include both audio streams and video streams.

In one implementation, sending device user 50a can make utterances 54a that are captured and processed into an audio stream by sending device 12a and sending device user 50b can make utterances 54b that are captured and processed into an audio stream by sending device 12b, for example, using the microphones 30a-b described in FIG. 1. If the sending devices 12a-b are close enough to each other, the sending device 12a can also capture a faint version of the utterances 54b and the sending device 12b can capture a faint version of the utterances 54a. The server 16 can process the audio streams and the processing can include multi-channel echo cancellation and multi-channel noise suppression.

Additionally, sending device 12a can capture the image of sending device user 50a and sending device 12b can capture the image of sending device user 50b, for example, using the front-facing cameras 28a-b described in FIG. 1. The captured images of the sending device users 50a-b can also include any background material behind the sending device users 50a-b, for example, an object such as a clock 56 can be present on a wall behind the sending device users 50a-b and the image of the clock 56 can be captured by both sending devices 12a-b. The processing of the captured utterances 54a-b and captured images can include encoding and/or any other processing required to create the media streams. It is to be understood that encoding could mean compression, transformation, or any other processing or change of data.

Once the media streams are captured and processed, the co-located sending devices 12a-b can transmit the encoded media streams to the server 16. The encoded media streams can include configuration information pertaining to the co-located sending devices 12a-b. The configuration information can include geo spatial location of the co-located sending devices 12a-b, IP addresses for the co-located sending devices 12a-b, system capabilities of the co-located sending devices 12a-b, and any other information regarding the co-located sending devices 12a-b. The configuration information described can also be referred to as demographic information. This configuration information can be stored at the server 16 or distributed across a third, remote location (not shown).

At the server 16, at least a first encoded media stream can be received from a first sending device, for example, sending device 12a, and at least a second encoded media stream can be received from a second sending device, for example, sending device 12b. The encoded media streams received from the co-located sending devices 12a-b can be processed as described in FIG. 3 below. Once processed, the server 16 can send at least the first encoded media stream to a first receiving device 20a and the second encoded media stream to a second receiving device 20b. It is understood that sending the media streams can include any method of transmitting or transferring the media streams from the server 16 to the receiving devices 20a-b.

The operations of the server 16 can be consolidated onto a single server. Alternatively, the functions of the server 16 can be distributed across a number of different machines. Although illustrated for simplicity as a unitary machine, it is understood that the server 16 of the system 10 is not necessarily implemented using a single processor or single physical machine. Further, the sending device users 50a-b can be more than two persons and have more than two sending devices 12a-b configured to access the server 16 and the receiving device users 52a-b can be more than two persons and have more than two receiving devices 20a-b.

Once at least the first encoded media stream is sent to the first receiving device 20a and the second encoded media stream is sent to the second receiving device 20b, the receiving devices 20a-b can decode and render the respective encoded media streams. For example, an audio stream comprising the utterances 54a captured by the microphone 30a of sending device 12a and a video stream comprising the video signals captured by the front-facing camera 28a of sending device 12a can be sent to the first receiving device 20a to be decoded and then rendered through the speakers 42a-b and display screen 40a of the first receiving device 20a. Similarly, an audio stream comprising the utterances 54b captured by the microphone 30b of sending device 12b and a video stream comprising the video signals captured by the front-facing camera 28b of sending device 12b can be sent to the second receiving device 20b to be decoded and then rendered through the speakers 42c-d and display screen 40b of the second receiving device 20b.

Although not shown, it is understood that the system 10 can operate in two directions, for example, the co-located sending devices 12a-b can also receive, decode, and render media streams sent from the co-located receiving devices 20a-b through the server 16. It is understood that decoding can mean decompression, transformation, or any other processing or change of data. The method of processing the encoded media streams for distribution to the plurality of co-located sending devices 20a-b is described in FIG. 3.

Figure 3:
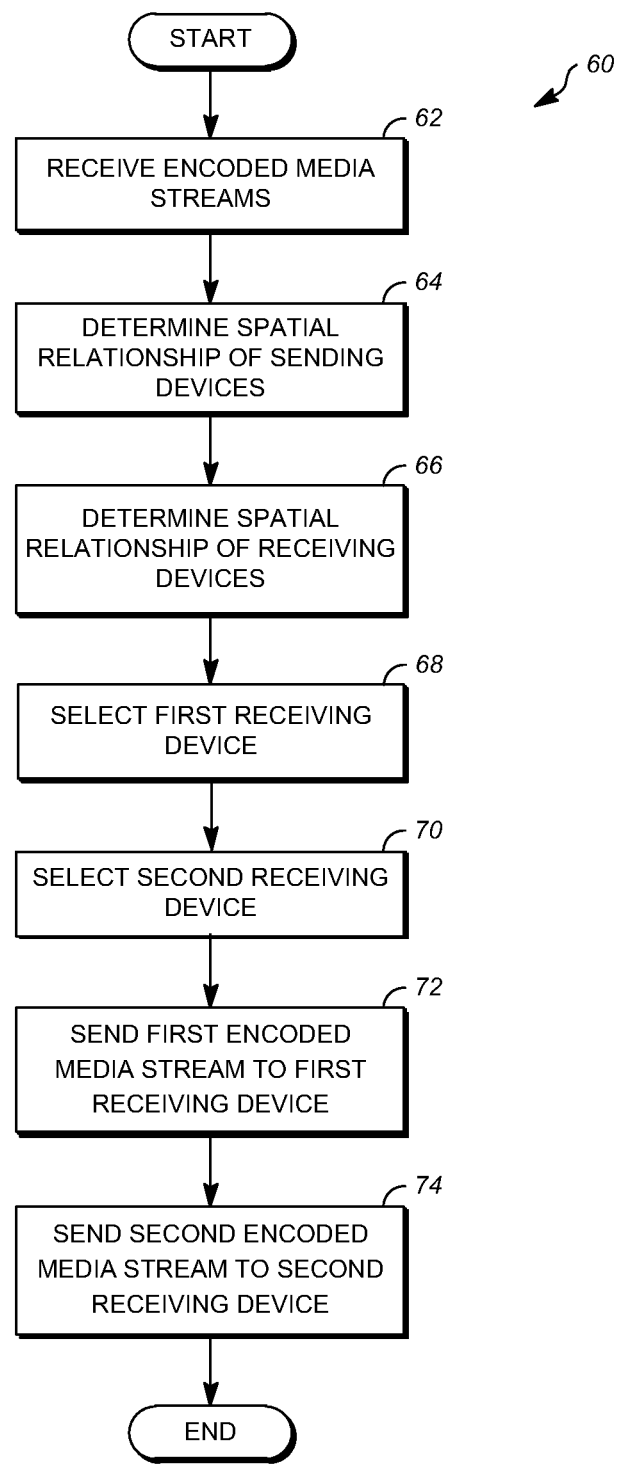
FIG. 3 is a logic flowchart of a process performed by the communication system.

Referring to FIG. 3, a logic flowchart is provided illustrating a process 60 performed by the communication system 10 described above in additional detail. Beginning at operation 62, the server can receive at least a first encoded media stream sent from a first sending device of a plurality of co-located sending devices and a second encoded media stream sent from a second sending device of the plurality of co-located sending devices. For example, the server 16 as shown in FIG. 2 can receive an encoded audio stream and an encoded video stream from the sending device 12a and an encoded audio stream and an encoded video stream from the sending device 12b.

After at least the first and second encoded media streams are received, the server can determine the spatial relationship between the plurality of co-located sending devices to define a sending spatial relationship at operation 64. Determining the spatial relationship between the plurality of co-located sending devices can include identifying physical locations for the plurality of co-located sending devices.

A first example of identifying the physical locations of the plurality of co-located sending devices is that the server can receive a signal from at least one of the co-located sending devices defining the physical locations of the plurality of co-located sending devices. For example, the server 16 can receive a signal from the first sending device 12a indicating that the sending device 12a is positioned to one side of the sending device 12b as shown in FIG. 2. The signal can be generated by the sending device 12a directly or by the sending device user 50a entering the physical relationship between the co-located sending devices 12a-b into the sending device 12a.

A second example of identifying the physical locations of the plurality of co-located sending devices is that the server can identify common subject matter in at least two of the encoded media steams. For example, the encoded media streams can be video streams received from the co-located sending devices 12a-b as shown in FIG. 2. These video streams can include similar representations of the clock 56 located behind the sending device users 50a-b as background material within the video streams. The video stream received from the sending device 12a can include the clock 56 to the right of the sending device user 50a and the video stream received from the sending device 12b can include the clock 56 to the left of the sending device user 50b. The location of the clock 56, or other background material, within the video streams can hence indicate the physical locations of the co-located sending devices 12a-b as adjacent to each other based on the common subject matter of the clock 56. When the video streams are decoded and rendered at the co-located receiving devices 20a-b (further described below) the clock 56 can be represented in video outputs 58a-b giving spatial continuity to the representations of the sending device users 50a-b.

In a third example of identifying the physical locations of the plurality of co-located sending devices using common subject matter, the encoded media streams can be audio streams having time stamps associated with the common subject matter recorded by the co-located sending devices. The time stamps of the common subject matter can be compared in at least two audio streams to determine the location of the audio source for the at least two audio streams. For example and as shown in FIG. 2, co-located sending devices 12a-b can both capture the utterances 54a made by the sending device user 50a. Sending device user 50a is positioned closer to the sending device 12a than the sending device 12b, thus the utterances 54a can be captured by the sending device 12a sooner than they can be captured by the sending device 12b. Additionally, co-located sending devices 12a-b can both capture the utterances 54b made by sending device user 50b. Sending device user 50b is positioned closer to the sending device 12b than the sending device 12a, thus the utterances 54b can be captured by the sending device 12b sooner than they can be captured by the sending device 12a. The timestamp differences in the common subject matter captured can aid the server 16 in determining the location of the audio sources (sending device users 50a-b) in relation to each other.

Once the spatial relationship between the plurality of co-located sending devices has been determined, the server can determine the spatial relationship between the plurality of co-located receiving devices to define a receiving spatial relationship at operation 66. Determining the spatial relationship between the plurality of co-located receiving devices can include identifying physical locations for the plurality of co-located receiving devices.

A first example of identifying the physical locations of the plurality of co-located receiving devices is that the server can receive a signal from at least one of the co-located receiving devices defining the physical locations of the plurality of co-located receiving devices. For example, the server 16 can receive a signal from a first receiving device 20a indicating that the receiving device 20a is positioned to one side of the receiving device 20b as shown in FIG. 2. The signal can be generated by the receiving device 12b directly or by the receiving device user 52a entering the physical relationship between the co-located receiving devices 20a-b into the receiving device 20a.

A second example of identifying the physical locations of the plurality of co-located receiving devices is that the server 16 can identify configuration information for at least some of the plurality of co-located receiving devices and map the configuration information to physical locations for at least some of the plurality of co-located receiving devices. The configuration information can include geospatial location of the co-located receiving devices, IP addresses for the co-located receiving devices, system capabilities of the co-located receiving devices, and any other information regarding the co-located receiving devices.

After the sending spatial relationship and the receiving spatial relationship have been defined, the server can select a first receiving device from the plurality of co-located receiving devices as a destination for the first encoded media stream based on the sending spatial relationship and the receiving spatial relationship at operation 68. For example and as shown in FIG. 2, the first encoded media stream can be captured by the sending device 12a. The sending spatial relationship as shown is that sending device 12a is physically located to the left of the sending device 12b. The receiving spatial relationship as shown is that receiving device 20a is physically located to the left of the receiving device 20b. To maintain these physical relationships, the server 16 can select the receiving device 20a as the first receiving device to receive the first encoded media stream that was captured by the sending device 12a.

Once the first receiving device is selected, the server can select a second receiving device from the plurality of co-located receiving devices as a destination for the second encoded media stream based on the sending spatial relationship and the receiving spatial relationship at operation 70. For example and as shown in FIG. 2, the second encoded media stream can be captured on the sending device 12b. The sending spatial relationship as shown is that the sending device 12b is physically located to the right of the sending device 12a. The receiving spatial relationship as shown is that the receiving device 20b is physically located to the right of the receiving device 20a. To maintain these physical relationships, the server 16 can select the receiving device 20b as the second receiving device to receive the second encoded media stream that was captured by the sending device 12b.

After the receiving devices are selected, the server can send the first encoded media stream to the first receiving device to be decoded and rendered on the first receiving device at operation 72 and send the second encoded media stream to the second receiving device to be decoded and rendered on the second receiving device at operation 74, and the process 60 ends. For example, the server 16 can send the first encoded media stream to receiving device 20a and the second encoded media stream to device 20b for decoding and rendering. In the case where the first and second encoded media streams are video streams, the receiving devices 20a-b can decode the video streams and render both video streams for the receiving device users 52a-b. The rendering of the video streams can create at least some spatial continuity as shown in the video output 58a-b in FIG. 2.

In at least some implementations of the communication system 10, at least the first and second encoded media streams can be synchronized based on the co-located sending devices once received at the server. In one example, synchronization can be accomplished at the server by synchronizing real-time transport protocol (RTP) timestamps for incoming frames with the network time protocol (NTP) timestamps in the real-time transport control protocol (RTCP) packets. This method of synchronization allows synchronizing different media streams as they relate to NTP so long as the co-located sending devices sending the encoded media streams have synchronized system clocks. The transformation of the media streams to NTP time can be accomplished using:

$$t_i = \alpha_k T_i + \beta_k$$

where $\alpha_k$ and $\beta_k$ are the parameters which relate the RTP timestamp of media stream k with the NTP time. These parameters can be calculated from two RTCP packets, which each contain both NTP and RTP timestamps:

$$\alpha_k = \frac{t_2 - t_1}{T_2 - T_1}$$

$$\beta_k = t_1 - \alpha_k T_1$$

If only one RTCP packet has been received, $\alpha_k$ can be set to:

$$\alpha_k = \frac{2^{32}}{9e5}$$

The fixed value of $\alpha_k$ in this example assumes the RTP timestamp rate is 90 kHz and that the integer part of the NTP timestamp is stored in the most significant 32 bits.

In at least some implementations of the communication system 10, at least the first and second encoded media streams can be synchronized based on the co-located receiving devices before being sent to the co-located receiving devices. In one example, the server can account for clock drift between the server and the plurality of co-located sending devices. In another example, the server can determine the rendering delay for the first receiving device and the second receiving device and synchronize the first encoded media stream and the second encoded media stream based on the rendering delay at the co-located received devices.

The implementations of the co-located sending devices 12a-b, server 16, and the receiving devices 20a-b (and the algorithms, methods, instructions etc. stored thereon and/or executed thereby) can be realized in hardware, software, or any combination thereof. The hardware can include, for example, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing hardware, either singly or in combination. The terms "signal" and "data" are used interchangeably.

Further, in one implementation, the server 16 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Further, all or a portion of implementations of the present disclosure can take the form of a computer program product accessible from, for example, a non-transitory computer-usable or computer-readable medium. A computer-usable or computer-readable medium can be any tangible device that can, for example, contain, store, communicate, or transport the program for use by or in connection with any processor. The medium can be, for example, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus.

The above-described implementations have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation so as to encompass all such modifications and equivalent structure as is permitted under the law.

What is claimed is:

1. A method of communicating, comprising:
receiving at least a first encoded media stream sent from a first sending device of a plurality of co-located sending devices and a second encoded media stream sent from a second sending device of the plurality of co-located sending devices;
determining a spatial relationship between the plurality of co-located sending devices to define a sending spatial relationship;
determining a spatial relationship between a plurality of co-located receiving devices to define a receiving spatial relationship;
selecting a first receiving device from the plurality of co-located receiving devices as a destination for the first encoded media stream based on the sending spatial relationship and the receiving spatial relationship;
selecting a second receiving device from the plurality of co-located receiving devices as a destination for the second encoded media stream based on the sending spatial relationship and the receiving spatial relationship;
sending the first encoded media stream to the first receiving device to be decoded and rendered on the first receiving device; and
sending the second encoded media stream to the second receiving device to be decoded and rendered on the second receiving device.

2. The method of claim 1 wherein determining a spatial relationship between the plurality of co-located sending devices includes:
identifying physical locations for the at least some of the plurality of co-located sending devices.

3. The method of claim 2 wherein identifying the physical locations for at least some of the plurality of co-located sending devices includes:
receiving a signal from at least one of the co-located sending devices defining the physical locations of at least some of the plurality of co-located sending devices.

4. The method of claim 2 wherein identifying the physical locations for at least some of the plurality of co-located sending devices includes:
identifying common subject matter in at least two of the encoded media streams received from the plurality of co-located sending devices.

5. The method of claim 4 wherein the at least two encoded media streams include at least two encoded video streams and the common subject matter is common background material in the at least two encoded video streams.

6. The method of claim 4 wherein the at least two encoded media streams included at least two audio streams having time stamps associated with the common subject matter and identifying the physical locations for at least some of the plurality of co-located sending devices further includes:
comparing the time stamps of the common subject matter in the at least two audio streams to determine the location of the audio source for the at least two audio streams.

7. The method of claim 1 wherein determining a spatial relationship between the plurality of co-located receiving devices includes:
identifying physical locations for at least some of the plurality of co-located receiving devices.

8. The method of claim 7 wherein identifying the physical locations for at least some of the plurality of co-located receiving devices includes:
receiving a signal from at least one of the co-located receiving devices defining the physical locations of at least some of the plurality of co-located receiving devices.

9. The method of claim 7 wherein identifying the physical locations for at least some of the plurality of co-located receiving devices includes:
identifying configuration information for at least some of the plurality of co-located receiving devices; and
mapping the configuration information to the physical location for at least some of the plurality of co-located receiving devices.

10. The method of claim 1 wherein the plurality of co-located sending devices and the plurality of co-located receiving devices are in separate locations.

11. A method of communicating, comprising:
receiving at least a first encoded media stream sent from a first sending device of a plurality of co-located sending devices and a second encoded media stream sent from a second sending device of the plurality of co-located sending devices;
synchronizing the first encoded media stream and the second encoded media stream based on the co-located sending devices;
determining a spatial relationship between the plurality of co-located sending devices to define a sending spatial relationship;
determining a spatial relationship between a plurality of co-located receiving devices to define a receiving spatial relationship;
selecting a first receiving device from the plurality of co-located receiving devices as a destination for the first encoded media stream based on the sending spatial relationship and the receiving spatial relationship;
selecting a second receiving device from the plurality of co-located receiving devices as a destination for the second encoded media stream based on the sending spatial relationship and the receiving spatial relationship;
synchronizing the first encoded media stream and the second encoded media stream based on the co-located receiving devices;
sending the first encoded media stream to the first receiving device to be decoded and rendered on the first receiving device; and
sending the second encoded media stream to the second receiving device to be decoded and rendered on the second receiving device.

12. The method of claim 11 wherein synchronizing the first encoded media stream and the second encoded media stream based on the co-located sending devices includes:
determining RTP timestamps and NTP timestamps for the first encoded media stream and second encoded media stream; and
synchronizing the first encoded media stream and the second encoded media stream based on the RTP and the NTP timestamps.

13. The method of claim 11 wherein synchronizing the first encoded media stream and the second encoded media stream based on the co-located receiving devices includes:
determining the rendering delay for the first receiving device and the second receiving device; and
synchronizing the first encoded media stream and the second encoded media stream based on the rendering delay.

14. A communication system, comprising:
a plurality of co-located sending devices, each co-located sending device including:
one or more processors, and
memory;
a plurality of co-located receiving devices, each co-located receiving device including:
one or more processors, and
memory; and
a server configured to communicate with the plurality of co-located sending devices and the plurality of co-located receiving devices, the server including:
one or more processors for controlling the operations of the server; and
a memory for storing data and program instructions used by the one or more processors, wherein the one or more processors are configured to execute instructions stored in the memory to:
receive at least a first encoded media stream sent from a first sending device of the plurality of co-located sending devices and a second encoded media stream sent from a second sending device of the plurality of co-located sending devices;
determine a spatial relationship between the plurality of co-located sending devices to define a sending spatial relationship;
determine a spatial relationship between a plurality of co-located receiving devices to define a receiving spatial relationship;
select a first receiving device from the plurality of co-located receiving devices as a destination for the first encoded media stream based on the sending spatial relationship and the receiving spatial relationship;
select a second receiving device from the plurality of co-located receiving devices as a destination for the second encoded media stream based on the sending spatial relationship and the receiving spatial relationship;
send the first encoded media stream to the first receiving device to be decoded and rendered on the first receiving device; and
send the second encoded media stream to the second receiving device to be decoded and rendered on the second receiving device.

15. The system of claim 14 wherein determining a spatial relationship between the plurality of co-located sending devices includes:
identifying common subject matter in at least two of the encoded media streams from the plurality of co-located sending devices.

16. The system of claim 15 wherein the at least two encoded media streams include at least two encoded video streams and the common subject matter is common background material in the at least two encoded video streams.

17. The system of claim 14 wherein determining a spatial relationship between the plurality of co-located sending devices includes:
receiving a signal from at least one of the co-located sending devices defining physical locations of at least some of the plurality of co-located sending devices.

18. The system of claim 14 wherein determining a spatial relationship between the plurality of co-located receiving devices includes:
identifying configuration information for at least some of the plurality of co-located receiving devices; and mapping configuration information to a physical location for at least some of the plurality of co-located receiving devices.

19. The system of claim 14 wherein determining a spatial relationship between the plurality of co-located receiving devices includes:
receiving a signal from at least one of the co-located receiving devices defining the physical locations of at least some of the plurality of co-located receiving devices.

20. The system of claim 14 wherein the plurality of co-located sending devices and the plurality of co-located receiving devices are in separate locations.

\* \* \* \* \*